United States Patent Office 3,473,887
Patented Oct. 21, 1969

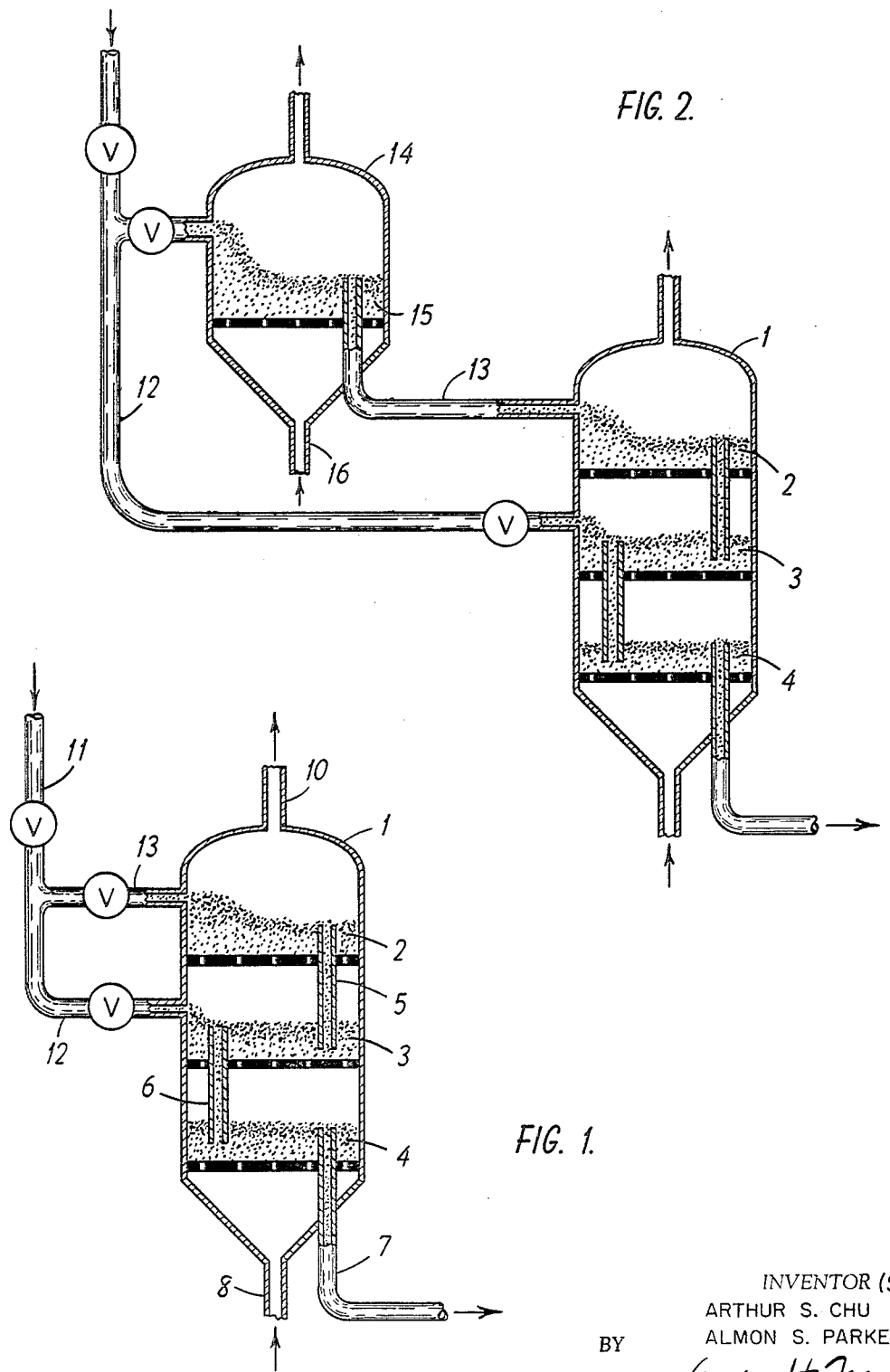

3,473,887
ALUMINUM FLUORIDE PRODUCTION
Arthur S. Chu, Morristown, and Almon S. Parker, Florham Park, N.J., assignors to Allied Chemical Corporation, New York, N.Y., a corporation of New York
Filed Feb. 21, 1968, Ser. No. 707,220
Int. Cl. C01f 11/22
U.S. Cl. 23—88          15 Claims

ABSTRACT OF THE DISCLOSURE

An improved process for the production of alumina trifluoride by fluorination of alumina trihydrate, or of alumina trihydrate and partially dehydrated alumina trihydrate, with a hydrofluoric acid bearing gas in multistage fluid bed reactors having at least three stages, is characterized in that the aluminiferous raw material feed is split between the uppermost and one or more of the intermediate stages.

BACKGROUND OF THE INVENTION

Aluminum trifluoride, a white crystalline solid, is an important industrial raw material used in large tonnages as a component of the electrolyte melt in the production of aluminum metal. Aluminum trifluoride is commercially produced by reacting alumina, $Al_2O_3$, with hydrofluoric acid. This reaction is commercially carried out either by wet processes in which alumina and hydrofluoric acid are contacted in aqueous media, or by dry processes in which alumina, alumina trihydrate, or partially dehydrated alumina trihydrate are contacted with gaseous hydrofluoric acid. Dry processes are advantageously conducted on a continuous basis in fluid bed reactors wherein a reaction gas stream comprising hydrofluoric acid is flowed upwardly through one or more beds of particles comprising aluminum trifluoride, alumina, alumina trihydrate, or partially dehydrated alumina trihydrate in such manner that the bed or beds of the finely divided aluminiferous particles are fluidized. The term hydrofluoric acid, as used herein, refers to HF whether or not associated with water.

When two or more fluid beds are employed, the aluminiferous raw material is fed to the uppermost bed, and the solid aluminiferous particles are serially transferred to the next lower bed countercurrent to the upwardly flowing gas stream until they are discharged from the lowermost bed in the form of the desired aluminum trifluoride product. Descriptions of fluid bed processes for the production of aluminum trifluoride from alumina or alumina trihydrate may, for example, be found in British Patent 656,374, and Canadian Patent 537,403.

To make fluid bed processes for the production of aluminum trifluoride economically attractive, and to avoid serious problems of exit gas purification or air pollution, it is desirable that at least 99 percent of the hydrofluoric acid charged to the reactor is utilized in the fluorination of the aluminiferous raw material. Unreacted hydrofluoric acid discharged from the reactor represents a loss of an expensive raw material, and, if vented to the atmosphere, presents an air pollution problem as well. Processes for the production of aluminum trifluoride for use in the production of aluminum, to satisfy commercial requirements, must also yield a product having a minimum assay of 90 percent $AlF_3$.

The formation of aluminum trifluoride from alumina and its trihydrate by direct reaction with hydrofluoric acid is illustrated by the following equations:

I. $Al_2O_3 \cdot 3H_2O \longrightarrow Al_2O_3 + 3H_2O$     −132,000 B.t.u./lb. mol $Al_2O_3$ II. $Al_2O_3 + 6HF \rightleftarrows 2AlF_3 + 3H_2O$     +245,000 B.t.u./lb. mol $Al_2O_3$ III. $Al_2O_3 \cdot 3H_2O + 6HF \longrightarrow 2AlF_3 + 6H_2O$     +113,000 B.t.u./lb. mol $Al_2O_3$ It should be noted that reaction II is reversible at higher temperatures. When aluminum trifluoride is heated in the presence of water, some pyrohydrolysis takes place with loss of fluoride values according to the equation $2AlF_3 + 3H_2O \rightarrow 6HF + Al_2O_3$. For this reason practical fluorination temperatures should not exceed about 1400° F.

Reaction I, calcination of alumina trihydrate to anhydrous alumina, is endothermic and requires heat input. Reaction II, fluorination of anhydrous alumina to aluminum trifluoride, is exothermic and generates heat in excess of that consumed in the calcination reaction I. The overall reaction III therefore shows a net gain of sensible heat. However, calcination as well as fluorination proceed with sufficient speed only above about 450° F. In practical application, additional sensible heat over and above that gained from the fluorination reaction must be supplied to attain and sustain temperature conditions under which calcination and fluorination will proceed smoothly at acceptable rates, and a substantial amount of sensible heat is lost by radiation and convection from the shell of the reactor as well as in the solid and gaseous products discharged therefrom.

The simplest way to fully utilize the heat generated in the fluorination reaction for the calcination of the alumina trihydrate is to conduct both, calcination and fluorination, simultaneously in a single fluid bed. In such arrangement the required external heat is the net difference between the losses of sensible heat from the reactor and in the reaction products, less the amount of sensible heat gained from the net exothermic effect of the overall reaction.

In a single stage fluid bed reactor, however, it is not possible to obtain a high rate of hydrofluoric acid utilization. Principal conditions favoring maximization of hydrofluoric acid utilization are (1) prolonged contact time of hydrofluoric acid and alumina, (2) high fluorination temperatures in the neighborhood of about 1000° F., but not in excess of about 1400° F., and (3) contact of gases lean in hydrofluoric acid with undiluted alumina. Single stage fluid bed reactors do not favor attainment of these conditions for these reasons:

(1) Hydrofluoric acid not only serves as the source of fluorine, but also serves as the gaseous fluidizing medium. As the alumina reacts with the hydrofluoric acid, water is liberated and in the gaseous fluidizing medium hydrofluoric acid is gradually replaced by steam. Linear gas flow velocity and bed depth determine the contact time between solids and gaseous fluidizing medium. A certain minimum gas flow velocity is required to maintain the reaction bed in fluidized state of turbulent suspension. While gas-solid contact time can be prolonged by increasing the bed depth, the increase in resistance to gas flow resulting from an increase in bed depth imposes practical limitations, and practical gas-solid contact times in fluid bed reactors are always limited.

(2) To maximize hydrofluoric acid utilization the reactor should be run at the highest temperature possible. However, as the temperature of the bed is increased, so increase losses of sensible heat in the reaction products, and these increased heat losses partially offset the heat savings to be gained by conducting the reaction in a single stage reactor.

(3) Because of the turbulent agitation of the solid particles comprising the fluid bed, the solid phase of the bed is of substantially uniform composition. This does not mean that all the individual particles in the bed are of the same composition, but rather that in the particle mix comprising the solid phase of the fluid bed the ratio of unreacted alumina to aluminum trifluoride is substantially uniform throughout the bed, and that, in a sense, the unreacted alumina is diluted with aluminum trifluoride. Since a commercially acceptable aluminum trifluoride product must have a minimum assay of about 90 percent $AlF_3$, and since in a single stage fluid bed process the composition of the solid phase of the bed by necessity must be identical to the composition of the product withdrawn therefrom, the solid phase must comprise a minimum of 90 percent aluminum fluoride. Consequently the hydrofluoric acid is contacted with alumina in substantially diluted form, and the result is a low hydrofluoric acid utilization rate.

The prior art has overcome some of the drawbacks of the single stage fluid bed reactor by conducting the process in multistage fluid bed reactors wherein the fluidization gas flows upwardly through a plurality of beds of gradually increasing alumina concentration in such fashion that, in the lowermost bed, gases of high hydrofluoric acid content are contacted with fluidized solids containing the alumina in greatest dilution, and that, in the uppermost bed, gases lean in hydrofluoric acid contact with substantially pure alumina.

While known fluid bed processes allow the production of aluminum trifluoride having an assay of about 90 percent $AlF_3$ and above, and allow hydrofluoric acid utilization of more than 98 or 99 percent of the amount of hydrofluoric acid charged to the reactor, such results are achieved only by use of complex and expensive equipment and under substantial heat penalties.

So, for example, the process disclosed in Canadian Patent 537,403 requires a fluid bed reactor having seven superposed fluid beds as well as provisions for cooling of one or more of these beds to achieve a utilization rate of hydrofluoric acid of more than 99 percent. Such reactors are complex and expensive, their use entails high heat losses, and processes conducted therein are difficult to control.

The fluid bed process disclosed in British Patent 656,374 employs reactors having as few as three superposed beds, but requires heating of the top stage and simultaneous cooling of one of the lower stages, and thus not only incurs substantial heat penalties, but also requires complicated cooling equipment.

In a three stage fluid bed reactor, calcination and fluorination are substantially conducted in physically separate beds, with the result that a substantial part of the heat generated by the fluorination reaction cannot be utilized for calcination of the trihydrate, and worse yet, must be removed from the fluorination bed to prevent overheating thereof. The reasons for the requirement of simultaneous heating and cooling may be visualized as follows: In a three-stage fluid bed reactor, as in any multi-stage fluid bed reactor, the temperature of any individual bed, in the absence of external heating or cooling, is principally determined by: (1) the temperature of the solid material fed to the bed, (2) the temperature of the gas entering the bed, and (3) the heat evolved or consumed in the reaction.

In a three-stage fluid bed reactor where solids and gas flow serially through the beds in countercurrent fashion, bed temperatures of all beds are interrelated, and a change in the temperature of one bed will bring about temperature changes in all other beds. To achieve calcination of the alumina trihydrate as well as sufficient reduction of the hydrofluoric acid content of the lean reaction gases prior to their exit from the reactor, the top bed of the reactor must be maintained at temperatures above about 450° F., preferably above about 500° F. Since the amount of heat available from the upwardly flowing hot gases from the middle bed is not sufficient to maintain the temperature of the top bed at that temperature level, external heating of the top bed is required.

In the middle bed calcination of the alumina trihydrate is brought substantially to completion, and most of the available alumina is fluorinated to aluminum trifluoride. Here the heat generated by the fluorination reaction is in excess of that required for substantial completion of calcination, and the solid material in the middle bed will attain an equilibrium temperature substantially higher than that of the top bed.

In the lowermost bed fluorination of most of the remaining alumina will be substantially brought to completion, and the heat generated by the fluorination reaction will maintain the equilibrium temperature of the lowermost bed above that of the middle bed. To some limited degree temperature of the lowermost bed can be controlled by regulating the temperature of the hydrofluoric acid feed gas.

To prevent overheating of the lower beds to temperatures above about 1400° F. the prior art resorted to cooling of these beds, either by means of heat exchangers associated with one or more of these beds, or by dilution of the alumina feed with aluminum trifluoride. This not only imposed a heat penalty, but in the case of use of heat exchangers also greatly increased the cost and complexity of the equipment and, in the case of dilution of the alumina feed with aluminum trifluoride, reduced the productive capacity of the reactor. In a multi-stage aluminum fluoride fluid bed reactor having one or more externally cooled beds the required net heat input to the upper bed is that amount of heat that would be required in the absence of cooling of any of the lower beds, plus an amount of heat equal to that removed from the lower beds.

It has also been suggested that cooling of the lower stages might be avoided by only partially calcining the alumina trihydrate in the uppermost stage, and to utilize the heat from the fluorination reaction which otherwise must be at least partially dissipated for completing the calcination. However, we have found that, in such a process, in order that external cooling of the lower stages may be avoided, calcination of the alumina trihydrate in the uppermost bed cannot be carried further than required to obtain an alumina hydrate product of a composition equivalent to about $Al_2O_3 \cdot 2 \cdot 8H_2O$. This may be accomplished by either providing a shallow uppermost bed, hence a short retention time of the alumina hydrate in the uppermost bed, or by maintaining the temperature in the uppermost bed at about 400° F. or below. In either case it is not possible to obtain a hydrofluoric acid utilization rate in excess of 99 percent.

There is a recognized need for a fluid bed process for the production of aluminum trifluoride from alumina trihydrate by direct reaction with hydrofluoric acid which avoids the stated shortcomings of the prior art processes.

It is a principal object of the present invention to provide an improved process for the production of aluminum trifluoride from alumina trihydrate and gaseous hydrofluoric acid in multi-stage fluid bed reactors, which combines the advantages of: (1) high utilization rate of hydrofluoric acid; (2) high product assay; (3) minimized heat energy requirement; (4) avoidance of the need for external cooling; (5) adiabatic operation of lower stages, hence easier controllability of the process; and (6) simplified design of the required processing equipment, hence lower equipment cost.

It is a further object of the present invention to provide an improved process for the production of aluminum trifluoride from alumina trihydrate and partially dehydrated alumina trihydrate by reaction thereof with gaseous hydrofluoric acid in multi-stage fluid bed reactors, which combines the advantages of: (1) high utilization rate of hydrofluoric acid; (2) high product assay; (3) minimized heat energy requirement; (4) avoidance of the need for external cooling; (5) adiabatic operation of all stages, hence easier controllability of the process;

and (6) simplified design of the required processing equipment, hence lower equipment cost.

Summary of the invention

These and other objects of the present invention are achieved by the provision of a method for the production of aluminum trifluoride by reaction of alumina trihydrate or alumina trihydrate and partially dehydrated alumina trihydrate with gaseous hydrofluoric acid in a multi-stage fluid bed reactor having at least three beds wherein the aluminiferous raw material feed is split between the uppermost stage and one or more of the intermediate stages. The process of this invention utilizes equipment of simple design and combines the heat economics theoretically attainable in a single stage reactor with the high hydrofluoric acid utilization rates heretofore attainable only in multistage reactors having provisions for cooling of one or more of the fluorination stages.

Detailed description of the invention

Our invention may be best understood with reference to the accompanying drawings, in which:

FIG. 1 is a schematic flow diagram of one embodiment of the process of the present invention;

FIG. 2 is a schematic flow diagram of a preferred embodiment of the process of the present invention.

In the flow diagram of FIG. 1 there is schematically shown a conventional three stage fluid bed reactor 1, having three superposed fluid beds 2, 3 and 4, of which 2 is the calcination bed, 3 is the upper fluorination bed, and 4 is the lower fluorination bed. Calcination bed 2 and upper fluorination bed 3 are equipped with overflow ducts 5 and 6 respectively through which solid material overflows from the upper to the next lower bed. The lower fluorination bed 4 is equipped with a discharge duct 7 through which the aluminum trifluoride product is discharged from the reactor 1. Gaseous hydrofluoric acid, preheated to about 110° F., enters reactor 1 at gas inlet 8, and the spent gas containing less than about 1 percent by weight of hydrofluoric acid is discharged from reactor 1 through gas outlet 10. Calcination bed 2 and, optionally, upper fluorination bed 3 are supplied with external heat. This is accomplished by conventional means, such as for example, by heat transfer through the reactor wall, use of external heat exchangers, internal heating coils, and others. Direct heat transfer through the reactor wall, for reasons of simplicity, is a preferred means for heating these beds. Alumina trihydrate of fine particle size is fed through alumina feed lines 11 and 13 to calcination bed 2, and through alumina feed lines 11 and 12 to upper fluorination bed 3.

In operation the individual beds are maintained within the temperature ranges shown in Table I below:

TABLE I

| | Minimum, °F. | Preferred, °F. | Maximum, °F. |
|---|---|---|---|
| Calcination bed | 450 | 500–600 | 800 |
| Upper fluorination bed | 600 | 700–900 | 1,000 |
| Lower fluorination bed | 800 | 900–1100 | 1,400 |

When apparatus having more than three fluid beds is employed, all of the beds intermediate the uppermost and lowermost beds are maintained within the temperature ranges shown above in Table I for the upper fluorination bed.

Only part of the alumina trihydrate feed is routed to calcination bed 2. In calcination bed 2 of the alumina trihydrate is fluidized by the gas stream comprising steam and hydrofluoric acid flowing upwardly from the upper fluorination bed 3, and it is pre-heated to desired temperature. The alumina trihydrate in calcination bed 2 is partially calcined to anhydrous alumina, which in turn is partially reacted with the hydrofluoric acid contained in the gas stream flowing upwardly from upper fluorination bed 3, thereby reducing the hydrofluoric acid content of this gas stream so that the gas leaving reactor 1 at gas outlet 10 contains less than about 1 percent by weight of hydrofluoric acid.

Solids from calcination bed 2 continually overflow through duct 5 to the upper fluorination bed 3, where they are mixed with fresh alumina trihydrate fed directly to upper fluorination bed 3 through alumina feed lines 11 and 12. The solids in upper fluorination bed 3 are fluidized by and contacted with the gas stream comprising steam and hydrofluoric acid flowing upwardly from lower fluorination bed 4. In upper fluorination bed 3 available alumina will react with hydrofluoric acid contained in the gas stream to form aluminum trifluoride. The heat liberated by the fluorination reaction, aided by external heat, if supplied, will complete calcination of the partially dehydrated aluminum trihydrate fed to upper fluorination bed 3 from calcination bed 2, will preheat and substantially complete calcination of the alumina trihydrate fed directly to upper fluorination bed 3 through alumina feed lines 11 and 12, and will further maintain upper fluorination bed 3 at an equilibrium temperature between about 600° and about 1000° F. Need for external cooling of upper fluorination bed 3 is completely avoided.

From upper fluorination bed 3 solids overflow to lower fluorination bed 4 through overflow duct 6. In lower fluorination bed 4 the solid material is fluidized by and contacted with a gas stream comprising hydrofluoric acid preheated to about 100° F. or above. In this bed most of the remaining unreacted alumina will be fluorinated to aluminum trifluoride. The heat liberated by the fluorination reaction will heat lower fluorination bed 4 to a temperature higher than that of the preceding upper fluorination bed 3, but cooling of lower fluorination bed 4 will not be required so long as the temperature of the upper fluorination bed 3 is maintained below about 1000° F. Minor temperature adjustments in lower fluorination bed 4 may be accomplished by varying the temperature of the incoming gas feed. The aluminum trifluoride product having an assay of at least 90 percent $AlF_3$, the balance comprising anhydrous alumina, is discharged from reactor 1 through discharge duct 7.

In this process the heat generated by the fluorination reaction is advantageously used for preheating and calcining the alumina trihydrate feed. Temperature control of calcination bed 2 is affected by varying the heat input to that bed. Temperature of upper fluorination bed 3 and lower fluorination bed 4 is effected by adjusting the proportion of alumina trihydrate feed to calcination bed 2 and upper fluorination bed 3. The higher the proportion of alumina trihydrate fed directly to upper fluorination bed 3, the lower the temperature in this bed. The process of this embodiment is capable of adiabatic operation in the two lower beds. External cooling is not required. The proportion of alumina trihydrate feed to calcination bed 2 and upper fluorination bed 3 required for operation within the temperature ranges shown in Table I, above, depends on variables such as equipment design, desired operating temperatures, amount of heat supplied to the calcination bed and, optionally, the upper fluorination bed, material throughput rates, and others, and for any given set-up is readily determined by routine experimentation. When the individual beds are operated at or near the respective outer temperature limits listed in Table I above, the proportion of alumina trihydrate feed to calcination bed 2 will lie between about 30 percent and about 70 percent of total alumina trihydrate feed to the reactor, and, when the individual beds are operated within the respective preferred temperature ranges listed in Table I, the proportion of alumina trihydrate feed to calcination bed 2 will lie between about 35 percent and about 45 percent of total alumina trihydrate feed to the reactor.

The schematic flow diagram FIG. 2 illustrates a preferred embodiment of the process of this invention which differs from the embodiment illustrated by schematic flow diagram FIG. 1 in that it incorporates a pre-heating and pre-dehydrating step for the solid raw material feed to calcination bed 2 of the three stage fluid bed reactor 1. This preferred embodiment, unlike the embodiment shown in FIG. 1, does not require supply of external heat to any of the reactor stages.

In the preferred embodiment shown in schematic flow diagram FIG. 2 the alumina trihydrate feed to calcination bed 2 in pre-dehydrator 14 is pre-heated to, and partially dehydrated at, temperatures in the range of from about 450° F. to about 900° F., preferably between about 500° F. and about 600° F.

While the pre-dehydrator 14 is illustrated as a fluid bed reactor having a fluid bed 15 comprised of partially dehydrated alumina trihydrate, fluidized by gaseous products of combustion entering the pre-dehydrator 14 at gas inlet 16, pre-heating and pre-dehydration may be accomplished in any conventional manner and in any suitable equipment well known to those skilled in the art, such as for example rotary kilns and others. The preferred means for pre-heating and pre-dehydrating is fluid bed heating by direct contact with the products of combustion of fuels such as gas, oil, or pulverized coal, whereby the combustion gases furnish the heat and at the same time serve as the fluidizing medium as illustrated in schematic flow diagram FIG. 2. Pre-heated and partially dehydrated alumina is then fed to calcination bed 2 of the three stage fluid bed reactor 1 through alumina feed line 13, and the balance of the alumina trihydrate is concurrently fed directly to upper fluorination bed 3 through alumina feed line 12. The reactor operates adiabatically in all three beds. Calcination bed 2 does not require external heating. Within the reactor the process proceeds in the manner described hereinabove in connection with the discussion of the process illustrated by FIG. 1. Temperatures of the individual beds are maintained within the temperature ranges listed above in Table I. Temperature control in calcination bed 2 is effected by varying the heat input to pre-dehydrator 14. Temperature control of upper fluorination bed 3 and of lower fluorination bed 4 is effected in the manner described hereinabove in connection with the embodiment illustrated by FIG. 1. The proportions of alumina trihydrate feed to calcination bed 2, via pre-dehydrator 14, and to upper fluorination bed 3 which, in conjunction with pre-dehydration in pre-dehydrator 14, is required for adiabatic operation of all three beds are within the ranges described hereinabove in connection with the embodiment illustrated by FIG. 1. The degree of dehydration required for adiabatic operation of the top bed depend on variables such as equipment design, desired operating temperatures, material through-put rates, and others, and for any given set-up can be determined by routine experimentation. Pre-dehydration of the alumina trihydrate feed to the top bed to a product having between about 0.8 and about 1.3 preferably between about 0.9 and about 1.2 mols of water associated with each mol of $Al_2O_3$ will allow adiabatic operation of the top stage.

With the exception of the split feed principle, and the combination of the split feed principle with the principle of partial dehydration of the alumina feed to the calcination stage, the features of the process of this invention are conventional. The design of the apparatus required for the practice of the process of this invention is within the abilities of those skilled in the art. The description of the apparatus herein is therefore limited to that arrangement required for the description of the novel features of the process of this invention.

The process of this invention is further illustrated by the following examples.

Example I

This example illustrates the operation of the embodiment shown by schematic flow diagram FIG. 1.

In a three stage fluid bed reactor constructed of "Inconel" (T.M.), having a diameter of 10½ ft., and a distance of 10 ft. between bed support plates, the latter having circular apenings of 7/36 in. diameter diameter with an 0.09% total open area, are established three fluidized beds of a height of 3 ft. each. The reactor has a production capacity of about 7510 #/hr. aluminum trifluoride product. The three fluidized beds, from the top down, have a temperature of 600° F., 800° F., and 1000° F., respectively. The alumina trihydrate feed to the reactor has a particle size of between 20 and 325 mesh (U.S.).

Of the total alumina trihydrate feed of 7050 #/hr. 41%, or 2900 #/hr. are fed to the uppermost bed, and 59%, or 4150 #/hr. are fed to the middle bed. Gaseous hydrofluoric acid, preheated to 110° F., obtained by evaporation of condensed liquid hydrofluoric acid, is fed in undiluted form to the lowermost stage at a rate of 4620 #/hr. Heat in the amount of about $1.6 \times 10^6$ B.t.u./hr. is supplied to each of the two upper stages by heat transfer through the reactor wall. The gas flow rates are about 0.45 linear foot/sec. in the two lower beds, and about 0.5 linear foot/sec. in the uppermost bed. The approximate compositions of the solid phases of the three fluidized beds are:

|  | percent $Al_2O_3$ | percent $H_2O$ | percent $AlF_3$ |
| --- | --- | --- | --- |
| Top bed | 82 | 15.3 | ≀. - |
| Middle bed | 50 | <1 | ;0 |
| Bottom bed | <10 | <1 | >90 |

The approximate hydrofluoric acid contents of the gas leaving the individual beds are, from top down, approximately <1%, 2.4%, and 65% by weight respectively. The process is operated under positive pressure throughout; the total pressure drop over the three beds is 75 in. $H_2O$. There is withdrawn from the lowermost bed an aluminum trifluoride product having an assay of about 90% $AlF_3$. The utilization rate of hydrofluoric acid is in excess of 99%.

Example II

This example illustrates the operation of the preferred embodiment of the process of this invention as shown by schematic flow diagram FIG. 2.

The three stage fluid bed reactor employed in Example II is identical to that employed in preceding Example I. A fluid bed pre-dehydrator of 9.75 feet diameter, with a bed support plate having circular openings of 7/32 in. diameter, and a 0.09% total open area is installed in the alumina feed line to the uppermost stage of the three stage fluid bed reactor. The fluid bed in the pre-dehydrator is 3 feet high. It is fluidized by the products of combustion of natural gas. The temperature in the fluid bed of the pre-dehydrator is maintained at 500° F. Within the thre stage fluid bed reactor are established three fluid beds of a height of 3 feet each, which are maintained at temperatures of, from top down, 600° F., 800° F., and 1000° F., respectively. Screen size of the alumina trihydrate feed is identical to that of the alumina trihydrate feed of Example I. Of the total alumina trihydrate feed to the system of 7050 #/hr., 29.5%, or 2080 #/hr., are fed directly to the middle bed of the reactor. From the pre-dehydrator there is fed to the upper stage of the reactor at a rate of 3830 #/hr. partially dehydrated alumina hydrate having a temperature of 465° F., and an approximate composition of $Al_2O_3 \cdot H_2O$. Gaseous hydrofluoric acid, obtained and pre-heated as described in Example I, is fed, in undiluted form, to the lowermost stage of the reactor at a rate of 4620 #/hr. The gas flow velocities in all three stages of the reactor are about 0.5 linear feet/sec. The approximate compositions of the solid phases of the three fluid beds of the reactor are:

|  | percent Al₂O₃ | percent H₂O | percent AlF₃ |
|---|---|---|---|
| Top | 82 | 15.3 | 2.7 |
| Middle | 50 | <1 | 50 |
| Bottom | <10 | <1 | >90 |

The approximate hydrofluoric acid content of the gas leaving the individual beds is from top down, approximately <1%, 2.4%, and 65% by weight respectively. The process is operated under positive pressure throughout; the total pressure drop over the reactor is 75 in. H₂O. There is withdrawn from the lowermost bed an aluminum trifluoride product having an assay of about 90% AlF₃. The utilization rate of hydrofluoric acid is in excess of 99%.

While, for the sake of simplicity of description only, the novel features of the process of the present invention have been described and illustrated with reference to three-stage fluid bed reactors having superposed beds, it is to be understood that the principles of the present invention are equally applicable to processes conducted in fluid bed reactors having more than three beds, as well as to processes conducted in fluid bed reactors in which the individual beds are not arranged in superposed relationship to each other, but are arraged in side-by-side relationship, or in any other relationship. When the process of the present invention is practiced in fluid bed reactors having more than three beds, temperature control in those beds intermediate the bed into which the hydrogen fluoride bearing reaction gas stream is first introduced and the bed through which the hydrogen fluoride bearing reaction gas stream passes last may be effected, in accordance with the present invention, by feeding alumina trihydrate starting material to one or more of these intermediate beds.

The present invention may be embodied in other forms, or may be carried out in other ways, without departing from the spirit or essential characteristics thereof. The present embodiments are, therefore, to be considered in all aspects as illustrative and not restrictive, the scope of the invention being solely limited by the appended claims.

We claim:
1. In a continuous multi-stage fluidized bed process for producing aluminum trifluoride from an aluminiferous starting material selected from the group consisting of alumina trihydrate and partially dehydrated alumina trihydrate, wherein a hydrofluoric acid bearing gas stream is caused to flow successively through at least three beds composed of aluminiferous particles selected from the group consisting of alumina, alumina trihydrate, aluminum trifluoride, and mixtures thereof, said beds being fluidized by the hydrofluoric acid bearing gas stream and being maintained at temperatures at which alumina trihydrate is calcined to alumina and at which alumina reacts with hydrogen fluoride to form aluminum trifluoride, wherein the aluminiferous starting material is continually fed to the fluidized bed through which the gas stream passes last, wherein the aluminiferous particles are continuously transferred in the fluidized beds from one bed to the next countercurrent to the order in which the gas stream contacts the beds, and wherein the aluminum trifluoride product is continuously removed from the fluidized bed through which the gas stream passes first; the improvement which comprises controlling the temperature of the bed or beds intermediate the bed through which the gas stream passes first and the bed through which the gas stream passes last by (1) continuously feeding between about 30 percent and about 70 percent of the aluminiferous starting material feed to the fluidized bed through which the gas stream passes last, and (2) simultaneously feeding the remainder of the aluminiferous starting material feed to one or more of the fluidized beds intermediate the bed through which the gas stream passes last and the bed through which the gas stream passes first, so that the temperatures in the intermediate bed or beds are maintained between about 600° F. and about 1,000° F.

2. The process of claim 1 wherein the aluminiferous starting material feed to the bed through which the gas stream passes last comprises between about 35 percent and about 45 percent by weight of the aluminiferous starting material feed.

3. The process of claim 1 wherein the aluminiferous starting material is alumina trihydrate, and wherein the aluminiferous starting material feed to the fluidized bed through which the gas stream passes last, before entering that bed, is continuously pre-heated to a temperature between about 450° F. and about 900° F., and is simultaneously pre-dehydrated to a water content between about 0.8 mol and about 1.3 mols of water per mol of alumina.

4. The process of claim 3 wherein the aluminiferous starting material feed to the bed through which the gas stream passes last comprises between about 35 percent and about 45 percent by weight of the aluminiferous starting material feed.

5. The process of claim 3 wherein the aluminiferous starting material feed to the bed through which the gas stream passes last is pre-heated to a temperature between about 500° F. and about 600° F.

6. The process of claim 3 wherein the aluminiferous starting material feed to the bed through which the gas stream passes last is pre-dehydrated to a water content of between about 0.9 mol and about 1.2 mols of water per mol of alumina.

7. The process of claim 3 wherein the aluminiferous starting material feed to the bed through which the gas stream passes last is pre-heated and partially pre-dehydrated in a fluid bed heater by fluidization with combustion gases.

8. The process of claim 4 wherein the aluminiferous starting material feed to the bed through which the gas stream passes last is pre-heated to a temperature between about 500° F. and about 600° F., and is pre-dehydrated to a water content of between about 0.9 mol to about 1.2 mols of water per mol of alumina.

9. The process of claim 7 wherein the starting material feed to the bed through which the gas stream passes last comprises between about 35 percent and about 45 percent by weight of the aluminiferous starting material feed.

10. The process of claim 9 wherein the starting material feed to the bed through which the gas stream passes last is pre-heated to a temperature between about 500° F. and about 600° F., and is partially pre-dehydrated to a water content of between about 0.9 mol and about 1.2 mols of water per mol of alumina.

11. The process of claim 1 employing three fluidized beds which are arranged in superposed relationship to each other, wherein the hydrofluoric acid bearing gas is continually fed to the lowermost bed, wherein the aluminiferous starting material is alumina trihydrate, and wherein heat is supplied to the uppermost bed to maintain the temperature of that bed between about 450° F. and about 800° F.

12. The process of claim 11 wherein the starting material feed to the uppermost bed comprises between about 35 percent and about 45 percent by weight of the aluminiferous starting material feed.

13. The process of claim 1 employing three fluidized beds which are arranged in superposed relationship to each other, wherein the hydrofluoric acid bearing gas is continually fed to the lowermost bed, wherein the aluminiferous starting material is alumina trihydrate, and wherein the aluminiferous starting material feed to the uppermost bed, before entering that bed, is continuously pre-heated to a temperature between about 450° F. and about 600° F., and is simultaneously predehydrated to a water content between about 0.8 mol and about 1.3 mols of water per mol of alumina.

14. The process of claim 13 wherein the aluminiferous starting material feed to the uppermost bed is pre-heated and pre-dehydrated in a separate fluid bed heater by fluidization with combustion gases.

15. The process of claim 14 wherein the starting material feed to the uppermost bed comprises between about 35 percent and about 45 percent of the aluminiferous starting material feed, is pre-heated to a temperature between about 500° F. and about 600° F., and is pre-dehydrated to a water content between about 0.9 and about 1.2 mols of water per mol of alumina.

References Cited

UNITED STATES PATENTS

| | | | |
|---|---|---|---|
| 1,937,885 | 12/1933 | Gitzen et al. | 23—88 |
| 2,588,075 | 3/1952 | Barr et al. | 48—206 |
| 2,766,185 | 10/1956 | Pansing | 23—1 XR |
| 2,867,506 | 1/1959 | Roberts | 23—1 XR |
| 2,886,899 | 5/1959 | Watkins | 23—1 XR |
| 2,996,354 | 8/1961 | LaCroix | 23—58 |

FOREIGN PATENTS

| | | |
|---|---|---|
| 656,374 | 8/1951 | Great Britain. |
| 911,837 | 11/1962 | Great Britain. |
| 1,016,894 | 1/1966 | Great Britain. |
| 537,403 | 2/1957 | Canada. |

OTHER REFERENCES

Engineering and Mining Journal, vol. 151, No. 3 (March 1950), page 84.

EDWARD STERN, Primary Examiner